US010372630B2

(12) United States Patent
Hellwig et al.

(10) Patent No.: US 10,372,630 B2
(45) Date of Patent: Aug. 6, 2019

(54) MEMORY PROTECTING UNIT AND METHOD FOR PROTECTING A MEMORY ADDRESS SPACE

(71) Applicant: Infineon Technologies AG, Neubiberg (DE)

(72) Inventors: Frank Hellwig, Wunstorf (DE); Glenn Ashley Farrall, Long Ashton (GB); Gerhard Wirrer, Hausham (DE)

(73) Assignee: Infineon Technologies AG, Neubiberg (DE)

( * ) Notice: Subject to any disclaimer, the term of this patent is extended or adjusted under 35 U.S.C. 154(b) by 15 days.

(21) Appl. No.: 15/784,403

(22) Filed: Oct. 16, 2017

(65) Prior Publication Data

US 2018/0113816 A1  Apr. 26, 2018

(30) Foreign Application Priority Data

Oct. 20, 2016 (DE) .................. 10 2016 220 639

(51) Int. Cl.
*G06F 12/14* (2006.01)
*G06F 12/06* (2006.01)
(Continued)

(52) U.S. Cl.
CPC .......... *G06F 12/145* (2013.01); *G06F 12/063* (2013.01); *G06F 12/14* (2013.01);
(Continued)

(58) Field of Classification Search
CPC ...... G06F 12/14; G06F 21/53; G06F 21/6272; G06F 12/063; G06F 12/1441; G06F 12/145; G06F 12/1491
(Continued)

(56) References Cited

U.S. PATENT DOCUMENTS 8,683,115 B2 * 3/2014 Balasubramanian ....................... H03K 19/0016 711/103
9,946,669 B2 * 4/2018 Robertson ............... G06F 13/24
(Continued)

OTHER PUBLICATIONS

Bahring, H., "Microcomputer Technology—vol. 1: Microprocessors and Digital Signal Processors", 3rd Edition, Berlin/Heidelberg: Springer-Verlag., 2002, pp. 328-333.
(Continued)

*Primary Examiner* — Pierre Miche Bataille
(74) *Attorney, Agent, or Firm* — Schiff Hardin LLP (57) ABSTRACT

A memory protector is configured to evaluate access requests referring to a memory address space. The access requests comprise address parameters referring to addresses of the memory address space. The memory protector comprises an address evaluator, an address results combiner, and a data register. The address evaluator is configured to evaluate whether the address parameters refer to address ranges of a set of address ranges and is configured to provide results regarding the address ranges. The address results combiner is configured to combine results provided by the address evaluator depending on access protection groups to which the address ranges are mapped to. The memory protector is configured to provide access grant results based on combinations provided by the address results combiner. The data register is configured to store data concerning the set of address ranges and concerning a mapping of the address ranges to the access protection groups.

17 Claims, 5 Drawing Sheets

(51) Int. Cl.
*G06F 21/62* (2013.01)
*G06F 21/53* (2013.01)

(52) U.S. Cl.
CPC ...... *G06F 12/1441* (2013.01); *G06F 12/1491* (2013.01); *G06F 21/53* (2013.01); *G06F 21/6272* (2013.01)

(58) Field of Classification Search
USPC .................................................. 711/137, 163
See application file for complete search history.

(56) References Cited

U.S. PATENT DOCUMENTS

| | | |
|---|---|---|
| 2008/0276051 A1 | 11/2008 | Renno |
| 2011/0067114 A1 | 3/2011 | Weber et al. |
| 2012/0216002 A1 | 8/2012 | Moyer et al. |
| 2016/0147672 A1* | 5/2016 | Atzmon .................. G06F 12/14 711/163 |

OTHER PUBLICATIONS

Segmentation Fault, Wikipedia, the free encyclopedia, Bearbeitungsstand, Sep. 14, 2016, URL: https://en.wikipedia.org/w/index.php?title-Segmentation_fault&oldid=739386672 [abgerufen am Jul. 6, 2017].

German Patent Office, Office Action issued for DE 102016220639.7, 9 pgs., dated Jun. 8, 2017.

* cited by examiner

MEMORY PROTECTING UNIT AND METHOD FOR PROTECTING A MEMORY ADDRESS SPACE

TECHNICAL FIELD

This disclosure relates in general to units and methods, and more particularly to a memory protecting unit and to a method for protecting a memory address space.

BACKGROUND

In computers or embedded processors, internal memory protection units (MPU) are implemented in order to provide protection for the memory or memory address space. During operation of a data processing system, any request including an access to the memory is controlled by the MPU that either grants or denies the access. The access is associated with different levels of an access hierarchy. Examples are supervisor level, user 1 and user 0 level or in case of virtual machines, Hypervisor, Level 0 and Level 1. It is known to map the memory using address ranges that are assigned to access levels. Different applications require different sets of address ranges. Further, a higher number of address ranges allows a more detailed handling of address ranges but increases the time required for evaluating access requests with regard to their validity.

SUMMARY OF THE INVENTION

In an embodiment, a memory protection unit is configured to evaluate access requests referring to a memory address space. The access requests comprise address parameters referring to addresses of the memory address space. The memory protection unit comprises an address evaluator, an address results combiner, and a data register. The address evaluator is configured to evaluate whether the address parameters refer to address ranges of a set of address ranges and is configured to provide results regarding the address ranges. The address results combiner is configured to combine results provided by the address evaluator depending on access protection groups to which the address ranges are mapped to. The memory protection unit is configured to provide access grant results based on combinations provided by the address results combiner. The data register is configured to store data concerning the set of address ranges and concerning a mapping of the address ranges to the access protection groups.

In a different embodiment, a method for protecting a memory address space comprises mapping a set of address ranges of the memory address space to access protection groups and comprises evaluating an access request referring to the memory address space. Evaluating the access request comprises: evaluating whether address parameters comprised by the access requests refer to address ranges of the set of address ranges, combining results regarding the address ranges based on the mapping, and providing an access grant result based on combinations of results regarding the address ranges.

The details of one or more embodiments are set forth in the accompanying drawings and the description below. Other features, objects, and advantages will be apparent for the description and drawings, and from the claims.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the disclosure, and do not limit the scope.

Figure 1:
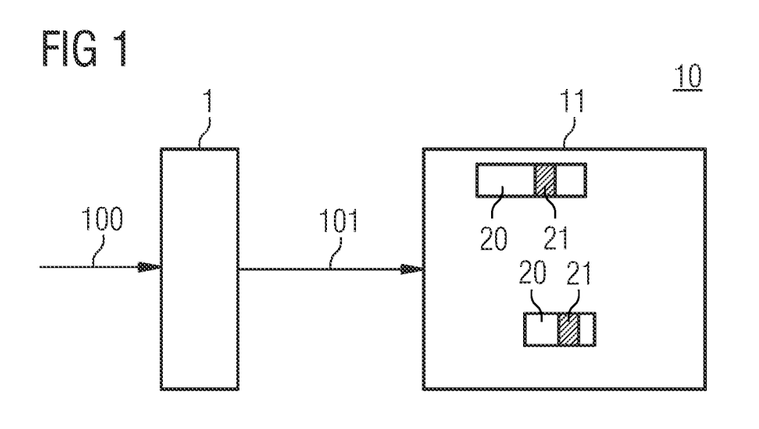
FIG. 1 shows a schematic arrangement of an embodiment of a memory protection unit as part of a data processing system.

FIG. 1 illustrates an embodiment of a memory protecting unit—abbreviated as MPU—1 as a part of a data processing system 10 (for example, a central processing unit, CPU). The memory protection unit 1 protects in one embodiment the physical memory, e.g., of a processor as a memory address space 11. In one embodiment, the memory or memory address space is related to a 'Memory Model' defined for a CPU architecture. Such a 'Memory Model' describes how address space is defined that can be accessed by the CPU. This implies, for example, global size of the address range, how it is organized e.g. in segments, segment size, all segments symmetric or some restricted for code/data/register, where is prefetching allowed etc. In a further embodiment, the memory protection unit 1 protects a memory address space that additionally or alternatively allows mapping to registers (address) or memories (address) or e.g. to external address ranges etc. Hence, in an embodiment, the memory address space 11 refers to external address ranges. External describes here address ranges that do not belong to the unit—e.g. processor or ASIC etc.—on which the memory protection unit 1 is running. The usage of the address memory space or its definition in practice does not limit the applicability of the described memory protection unit 1. The protected memory address space 11 is any region for storing data. In an embodiment, the memory address space refers to a memory as such and refers in a different embodiment to a register. Embedded processor architectures are usually defined for safety-critical embedded applications with a protection system—here realized partially by the MPU 1—to protect core system functionality from the effect of software errors and to prevent not authorized software tasks from accessing critical system resources. A protection system includes usually: a memory protection unit, different in/out (I/O) privilege levels, and a trap system.

The MPU 1 (or more precisely: memory address space protection unit) is configured to control the access of access requests 100 to the memory address space 11 of the data processing system 10. Controlling means that the access is either granted or denied. In case of a denied access, the MPU 1 in the shown embodiment initiates a TRAP. A trap—also known as exception or fault—is usually a type of synchronous interrupt and results in an embodiment in a switch to kernel mode allowing the operating system to perform some action before returning control to the originating process. In case of a granted access, the allowed access request—as a possible output 101 of the MPU 1—performs an interaction with the memory address space 11. The interaction belongs to one of three types of interaction: reading, writing or code executing. This implies either that data is read from or written into the memory address space 11 or that code is executed performed using the memory address space 11.

The access to the memory address space 11 is directed to at least one register of the memory address space 11 specified by an address 21. The addresses of the memory address space 11 are associated with different address ranges 20. The different address ranges 20 allow at least one type of interaction and are associated via access protection groups to privilege levels, also called I/O privilege level. The privilege levels are, for example, denoted by the letter L and a number 0, 1, 2 . . . where a higher number implies a lower level and reduced access rights.

Examples for different privilege level are:
Supervisor (SV) mode: this permits read/write access to system registers and all peripheral devices.
User1 mode: this allows application tasks to directly access non critical system peripheral devices.
User0 mode: this is used for tasks that do not access peripheral devices.

The shown range-based memory protection system is e.g. used for small or low cost applications for systems that do not require virtual memory (page based, MMU). The memory protection unit 1 is, for example, used in a real time application where a virtual memory protection system (MMU) has disadvantages due to its non-deterministic behavior (e.g. page reloads).

In different embodiments, such a protection system is based on multiple configurable protection ranges:
A protection range—here also named address range—is a continuous part of address space for which access permissions are specified.
A protection range specifies the CPU access permissions regarding the above mentioned types of interaction: data read access, data write access, code execution access.
A protection range is defined by a lower boundary and an upper boundary. An address belongs usually to an address range, if the lower boundary is smaller than or equal to the address and if the address is lower than the upper boundary.
The protection ranges are, for example, pre-defined as data protection ranges that specify data access permissions, e.g. reading and writing, and/or code protection ranges that specify instruction fetch permissions.
An example for a number of ranges/granularity is: eight address ranges for code, 16 address ranges for data, granularity eight bytes.

In an embodiment, the ranges of the memory address space are fix assigned to CPU code fetches and to CPU data access. This improves the CPU overall timing despite a reduced flexibility. In a different embodiment, general purpose address ranges are implemented and assigned to code fetch or data access via configuration parameters. The parameters of a data range are, e.g., upper and lower boundary, read enable, write enable. Instruction ranges are defined by an upper and a lower boundary.

Usually the number of code and data protection ranges as well as the granularity for lower and upper boundaries varies:

A higher number of protection ranges provides a more fine grained control for task access to on chip resources without the need to re-program the MPU sets when changing form one task to another.
A higher number of protection ranges adds complexity in the timing critical access path from the CPU kernel to local CPU memories and on chip resources. Further, the address comparison logic related to the range check is by definition in the critical path from CPU kernel to system memories or peripherals. Thus, a high number of ranges increases the access latency. Therefore, a higher number tends to reduce the maximal frequency that can be achieved for a given set of CPU architecture or chip technology. A high number also increases access latency in number of CPU clock cycles.

A reaction to a memory address space protection violation—here given by a denied access—is a TRAP/non maskable interrupt (NMI). Depending on the kind of denied access, it is classified as illegal data access or an instruction exception.

A complete set of access permissions defined for the whole address space used, is called e.g. a protection set. A protection set comprises in an embodiment a set of selected code protection ranges and/or a set of data protection ranges. The protection set defines in an embodiment both data access permissions and instruction fetch permissions. In an embodiment, a protection set enables the software to define free which ranges are assigned to the protection set. Such a protection set is fully configurable. In another embodiment, a protection set comprises data about a set of address ranges, about the allowed/associated interactions and about the access protection groups to which the address ranges are mapped to.

Having various protection sets allows for a rapid change of the set of access permissions when switching e.g. between User and Supervisor mode or between different User tasks. This also refers, for example, to switching between different protection levels and different tasks. For example, one task might be in User Mode whereas a different task is executed in Supervisor Mode.

A protection set determines the legality of memory address space access by the current task, i.e. the access request. A processor internal control register field determines the current protection register set number. When using sets, there is in one embodiment no limitation to only one set active at a time, i.e. more than one set is active. The set registers are the preferred way to enable and/or to disable multiple sets in one cycle. In a different embodiment, the software or application using the memory protection unit changes the enable status of the ranges sequentially.

In an embodiment, the access permission is set for intersecting memory ranges as follows: If one of the ranges allows it, the memory access is permitted. This means that when two ranges intersect, the region covered by both ranges will have the permission of the most permissive range concerning the interaction. Hence, nesting of ranges can be used to allow e.g. read/write access to a subrange of a larger range in which the current task is allowed read access. Write permission to change Memory Protection related control registers is in one embodiment only given to the highest privilege level, used as Operating System Level.

In another embodiment, the MPU allows a flexible Hypervisor support. This is done by providing an I/O privilege mode (Hypervisor) and two levels of memory address space protection, thus, covering at least three different privilege level:
A Hypervisor level.
A Level 0 (called for brevity L0) controlled by the Hypervisor task. The L0 defines the memory ranges in which a Virtual Machine is enabled to access on chip resources. With the L0 memory protection ranges, the Hypervisor is able to provide the required encapsulation between different virtual machines. Write permissions to change the L0 ranges are only given to the Hypervisor privilege level.

A Level 1 (abbreviated as L1) controlled by the virtual machine (VM) task. In one embodiment, the L1 is also controlled by the Hypervisor as it has the highest I/O privilege mode. With the L1 memory protection ranges or sets, the virtual machine can control the memory address space ranges in which tasks with a lower I/O privilege level can operate but only in the ranges as defined by L0. Write permissions to change the L1 ranges are in one embodiment only given to the Hypervisor and/or the VM privilege level.

In an embodiment, the access permissions for intersecting memory address space ranges in such a Hypervisor system are given as follows:

L0 ranges are combined logically by an OR relationship.
L1 ranges are OR combined, too.
L0 ranges and L1 ranges are combined by an AND relationship.

Features of the protection of the memory address space are:

Address ranges (defined at least by upper and lower boundaries) of the memory address space are mapped to access protection groups associated with different privilege levels (e.g. hypervisor, virtual machine, user0). Thus, the assignment is configurable.

The attribution of address ranges to access protection groups is preferably only allowed to accesses with the associated privilege level or with a higher privilege level. For example, only a hypervisor can map the address ranges to the respective groups.

The address ranges cannot be configured by any kind of privilege level but just by specified privilege levels or groups (e.g. a virtual machine can modify only an address range mapped to it).

The address ranges are also in one embodiment associated with certain kinds of interaction (e.g. read, write, execute) that are allowed for the respective address ranges.

Concerning granting access, the results of evaluating the address ranges affected by an access request are OR combined if they are associated with the same group. This provides a result for the active (concerning the access request and the intended access) ranges. The results concerning the active and differing groups are AND combined.

Figure 2:
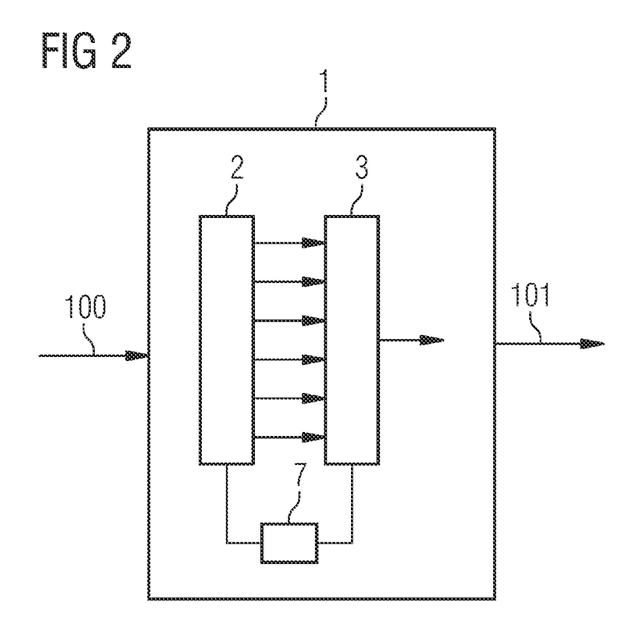
FIG. 2 illustrates an embodiment of a memory protecting unit.

In FIG. 2, details of a configurable multilevel memory protection unit (MPU) 1 are shown. It has the advantage of being flexible enough to cover the needs for different application scenarios. Further, it does not require a high overhead of ranges that results in a reduced maximum frequency of the design. The shown MPU 1 receives an access requests 100 and lets it either pass as an allowed access request 101 or denies the access to the memory address space shown in FIG. 1. In an alternative embodiment, the MPU 1 initiates a TRAP in case of a denied access. The access request 100 is associated with certain parameters referring in this embodiment to at least one address of the memory address space and referring to a type of interaction.

The MPU 1 comprises an address evaluator 2 and an address results combiner 3. The components are realized in one embodiment by corresponding logic elements. Further, the MPU 1 has access via a data register 7 to at least one set (or plurality) of address ranges with allowed interactions and mapped to access protection groups. The access protection groups are in one embodiment associated with different privilege levels like e.g. Hypervisor, Level 0 and Level 1 or Supervisor, User 1 and User 0. The access protection groups in the following are numbered, i.e. Group 0, Group 1, . . . Group x.

The address evaluator 2 compares the at least one address parameter of the access request 100 with the address ranges of the set of address ranges. This implies that the address evaluator 2 identifies the address ranges to which the at least one address parameter of the access request 100 refers. It is especially possible that the address parameter refers to more than one address range, as the address ranges may overlap or intersect. In an embodiment, the address evaluator 2 provides for each address range of the set of address ranges a logical value true or false (or 1 and 0) depending whether the address belongs to the respective address range or does not. The address evaluator 2 is in the given embodiment further configured to compare the interaction parameter comprised by the access request 100 with the type of allowed interaction of the respective active address range. This implies that the address evaluator 2 evaluates whether the interaction desired by the access request 100 and described by an interaction parameter is allowed for the active address ranges of the set of address ranges. Active address ranges are address ranges to which the address parameters refer to. In an embodiment, the address evaluator 2 comprises a plurality of comparators that are configured to decide whether an address parameter refers to a address range or not, i.e. whether the address is greater than or equal to a lower bound and smaller than an upper bound.

The two comparisons (associated with two questions: Belongs the address parameter to an address range? Is the type of interaction allowed for the address range?) are performed for all address ranges defined by the set of address ranges and lead to one result for each address range. The result is in one embodiment a logical true (or 1) or false (or 0). For example, a true value for an address range indicates that the address parameter refers to this address range and that the interaction parameter is an interaction associated with or allowed for this address range. A false value indicates that either the address parameter does not refer to an address range or that a wrong interaction parameter is given by the access request.

The address results combiner 3 combines the results of the address evaluator 2 using the access protection groups. The address results combiner 3 is configured to combine results belonging to address ranges mapped to the same access protection group with an OR combination. The address results combiner 3 further combines the results with an AND combination if they belong to different active access protection groups where active access protection groups are access protection groups to which active address ranges are mapped to. As only active access protection groups are AND combined, such access protection groups are excluded from the evaluation to which only address ranges are mapped to which the address parameter does not refer to. In a further embodiment, access protection groups are excluded from the AND combination based on data of the data register 7 indicating that these specific groups are switched off (or not switched on). Hence, this embodiment allows to specify groups that even if they are active are not considered by the AND combination.

The result of the AND combination indicates whether access is granted or denied, i.e. whether the access request 100 can access the memory address space or not. This is indicated by the output 101 of the MPU. The necessary data concerning the address ranges, the access protection groups, and the allowed interaction is stored here in one data register 7 which is connected with the address evaluator 2 and the address results combiner 3. The data register 7 is in a different embodiment divided in separate data registers. In an embodiment, the data register 7 can be accessed from the outside for defining the respective settings.

The data register 7 storing the information about the address ranges is provided in an embodiment with a write protection. The write protection allows in an embodiment each group only access to the data referring to address ranges mapped to the respective group. For example, the privilege level virtual machine has write access for defining only the address ranges mapped to the respective group. In an embodiment, a write protection or register write protection refers to a fix or configurable mechanism that defines which task is allowed to write to these registers (e.g. here data registers). The access to the data register is in one embodiment based on a privilege level (for example, Hypervisor has write access to map configuration and group0, VM0 and Hypervisor have access to Group1 etc.). In a different embodiment, the access is configurable by using privilege level or an identification of the task or on chip bus unique TAG-IDs.

In an embodiment, the data register is such configured that defining data concerning at least one address range is enabled only for a privilege level associated with an access protection group to which the at least one address range is mapped to. In a different embodiment, the data register is such configured that defining data concerning at least one address range is enabled only for a privilege level associated with an access protection group to which the at least one address range is mapped to or for a higher privilege level. Both embodiments restrict the access to the data register and limit the possibility for defining, configuring or modifying the data concerning the address ranges to some privilege levels. These are either only the privilege level associated with the access protection group to which the address range is mapped to or the mentioned privilege level and a higher privilege level in the respective hierarchy (e.g. if the access protection group refers to virtual machine, then also the hypervisor can change the setting of the address range). Especially, modifications of groups with an inferior access level are prohibited. According to an embodiment, the data register 7 is configured to enable switching on or off access protection groups relating to being included by the address results combiner for combining the results with an AND combination. This is also restricted to the associated privilege level or in a different embodiment to the associated privilege level and a higher privilege level. In an embodiment, the mapping of address ranges to access protection groups can only be modified when the highest privilege level is given (e.g. only a Hypervisor can change the data). The definitions of the address ranges are in one embodiment limited to setting the associated interactions. In a different embodiment, the restriction of the modification and the write protection refer to the definition of the address ranges (i.e. upper and lower boundary) and/or to mapping the address ranges to groups and/or to allowing interactions.

In case of MPU protection violation, i.e. in case of a negative access grant result 101, a trap calls the privilege level associated with the group where the violation was detected. Hence, if the address parameters refer to an address range mapped to a group1 (associated with virtual machine) but the interaction parameter differs from the interaction associated with (or allowed for) the address range, then a violation of group1 occurred and the trap as an indicator of an access violation calls the virtual machine, i.e. group1. If a violation of group0 happens, then the trap calls Hypervisor. In a different embodiment, in case of a negative access grant result 101, always the highest available privilege level of the system to which the memory protection unit belongs is called.

Figure 3:
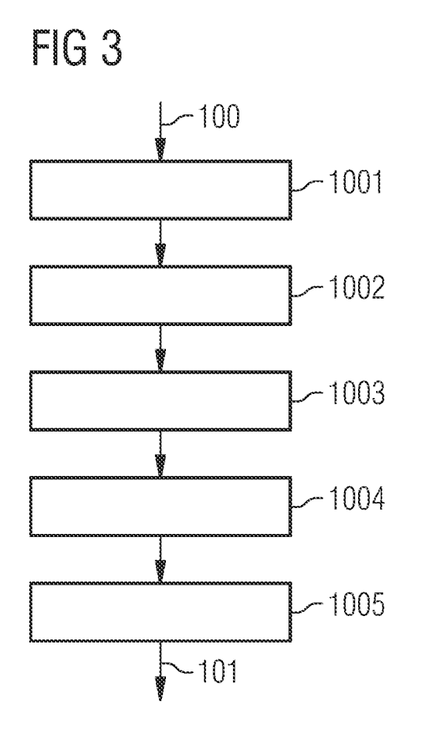
FIG. 3 illustrates a sequence of steps for protecting a memory address space.

The method for protection the memory address space will be explained once more with FIG. 3 showing an embodiment of the different steps of the method. The sequence starts with step 1001 by receiving an access request having address parameter and interaction parameter. In step 1002 the address parameter are compared with the address ranges of the set of address ranges. Thus, active address ranges are identified. In step 1003 the interaction parameter is compared with the kind of interaction associated with the active address ranges. The results of step 1002 and 1003, thus, indicate to which address range the access request 100 refers and whether the interaction intended by the access request 100 is allowed for these address ranges. In step 1004 the results concerning the different address ranges are combined with regard to the access protection groups to which the active address ranges are mapped. The results of address ranges belonging to the same access protection group are OR combined. In the following step 1005 the results of step 1004 are combined using an AND combination by combining the results concerning the active but different access protection groups. On the AND combination, the access grant result 101 is based indicating whether access is either granted or denied.

Figure 4:
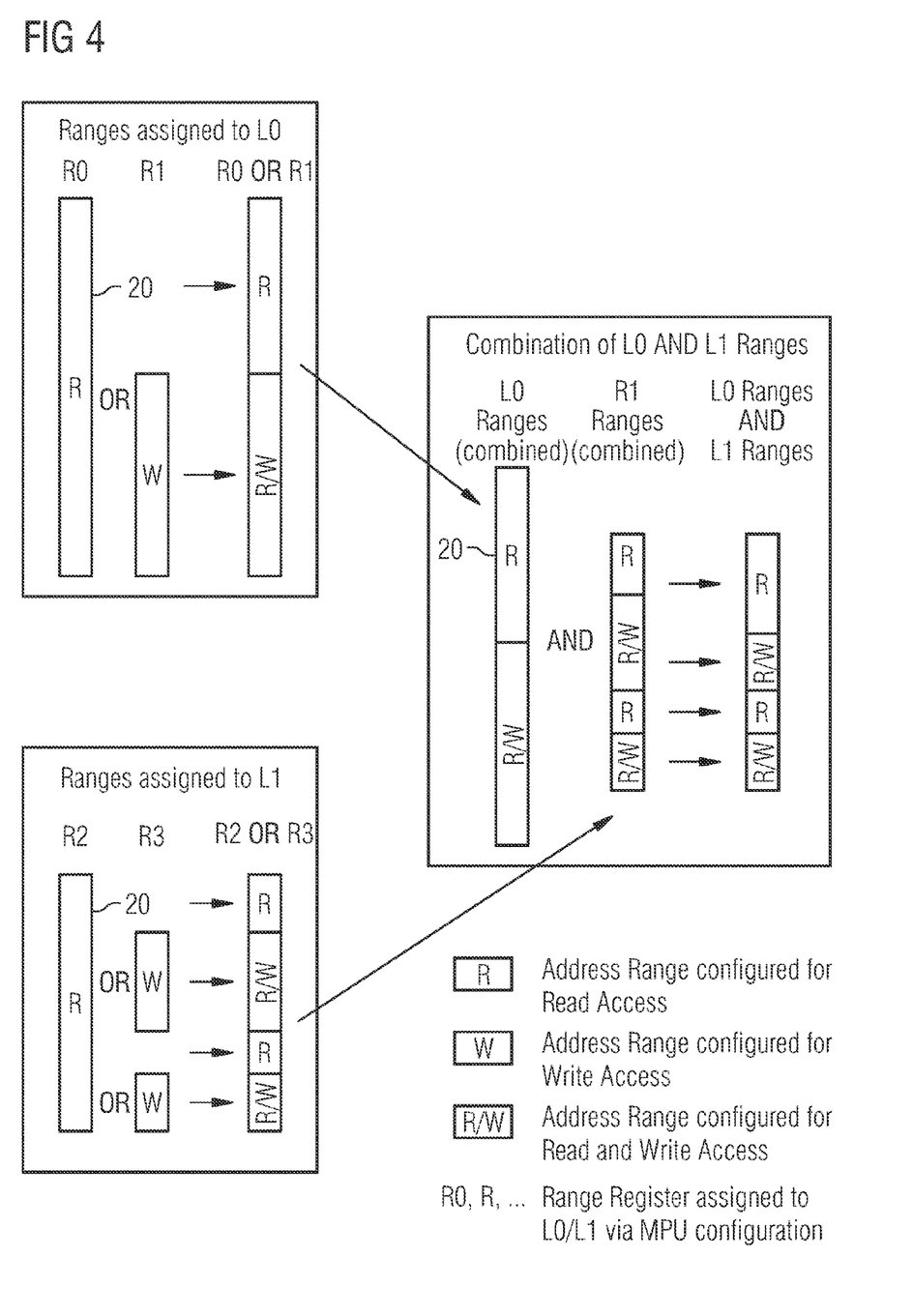
FIG. 4 illustrates a case of intersecting address ranges.

In FIG. 4, the effect of intersecting address ranges is illustrated. Shown are address ranges 20 belonging to a access protection group L0 (upper box on the left) and L1 (lower box on the left), respectively. Given are four address ranges: R0, R1, R2, and R3. Ranges R0 and R1 are mapped to group L0. Ranges R2 and R3 are mapped to group L1. Further, the ranges are configured for write access (denoted by W) or read access (denoted by R). The position and length of ranges here give an impression of the position and extension of the addresses covered by the respective address ranges. The two address ranges R0 and R1 mapped to the same group L0 are OR-combined. As R0 with read access is larger than R1 having write access, the combined address range "R0 or R1" has the dimension of R0 and is configured partially to read and write access (denoted by R/W) and partially to read access. The read and write access is given by the overlapping range of R0 and R1. The two address ranges R2 and R3 mapped to group L1 are also OR-combined. R3 comprises two separate address ranges which are configured for write access. The resulting address range "R2 OR R3" has two ranges configured for read access and two ranges configured for read and write access. If the ranges belonging to L0 (R0 OR R1) and L1 (R2 OR R3) are AND combined, the resulting address range shows the extension of the smaller OR combination (here belonging to L1). Further, the type of allowed access depends on the address ranges where the same type of access is allowed. The result of the AND combination is shown on the right of the box in the middle.

Figure 5:
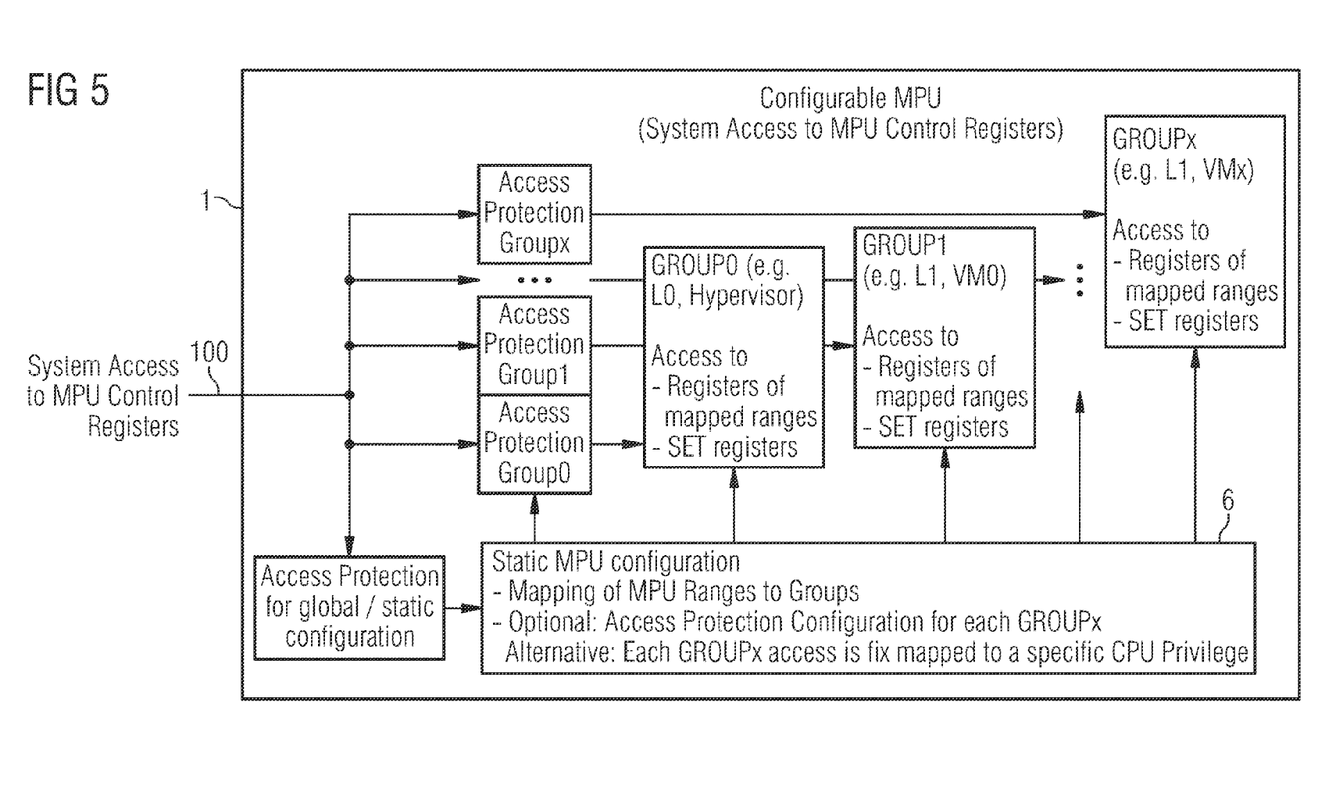
FIG. 5 shows an embodiment of a memory protecting unit in an abstract way.

FIG. 5 shows an embodiment of the MPU 1 and the processing of an access request 100 in an abstract way. The access request 100 as a intended system access to MPU control registers reaches the configurable MPU 1 which allows or denies the system access to MPU control registers.

The access request 100 starts an Access Protection for global or static configuration (lower box on the left) which implies initiating in this embodiment a static MPU configuration implying here two components (lower box in the middle):

Mapping of MPU address ranges to access protection groups.

Optional: Access Protection Configuration for each of the access protection groups.

Alternatively, each access protection group is fix mapped to a specific CPU privilege. Thus, the address ranges and definitions of access protection groups are set according to the current application and usable for evaluating the access request 100.

At first, based on the parameters of the access request 100, it is evaluated which access protection group is to be considered (block on the left with "Access Protection Groupx" down to "Access Protection Group0"). Here, x+1 is the number of access protection groups for the current application. This evaluation is based on the address ranges affected by the access request and by the type of interaction.

The Access Protection Groups are followed by a specific Group Access to registers of mapped ranges and to SET registers. Here, Group0 is for example associated with L0 or Hypervisor, depending on the kind of application, Group 1 is associated with L1 or Virtual Machine (VM), and a Groupx covers the privilege levels L1 or another Virtual Machine (VMs). The mechanism shown in FIG. 5 ensures in an embodiment that only a user with the for this purpose specified privilege level (e.g. the highest privilege level, e.g. the Hypervisor) can map address ranges to access protection groups (e.g. virtual machine or hypervisor). Further, the different virtual machines (VMx), for example, can only configure address ranges assigned to them. This is based on the fact that for modifying the map configuration, the privilege level of the Hypervisor must be given (as an example for the privilege level that is higher than the privilege level for which access is granted to the respective address range).

In total, address ranges are mapped via configuration (i.e. definitions) to access protection groups where each of these groups is assigned to a different I/O privilege level. In different embodiments, the following features are given:

A register, for example, belonging to the memory protection unit 1 allows to control that the mapping has a dedicated access protection mechanism.

A register, for example, belonging to the memory protection unit 1 allows to enable or disable a access protection group for the AND combination.

Each access protection group covers control registers of address ranges that are assigned to it.

The kind of access protection mechanism of the groups is either configurable or fixed. This refers e.g. to the possibility of granting access to address ranges assigned to "lower" privilege levels. For example, L0 can be modified only by Hypervisor, whereas L1 can be modified by Hypervisor and/or virtual machine in an embodiment.

Information about address ranges mapped to the same access protection group is OR combined (e.g. all L0 ranges).

Information about different active access protection groups is AND combined (e.g. the group assigned to L0 and the group assigned to L1).

In an embodiment, an option is given to enable or disable (or switching off and on) an access protection group concerning the AND combination of this group. This refers e.g. to an MPU with more than two groups.

In an embodiment, each access protection group is associated with a set register storing the related settings. The set register allows in an embodiment to enable or disable address ranges assigned to the respective group. In a different embodiment, the set registers are themselves protected with a dedicated access protection mechanism that is in one embodiment the mechanism of the related group. For example: A hypervisor can use a L0 set register to switch fast between settings or different virtual machines (VMx). Each virtual machine (VMx) can use its set registers to switch fast between settings for the different tasks.

On detection of an access protection violation—i.e. in case that a non-valid access request is detected—a trap is signaled in one embodiment to the privilege level related to the groups I/O privilege level where the range was violated. This implies that in case that it is detected that the interaction parameter differs from the interaction allowed for/assigned to an active address range mapped to a specific group, then the privilege level associated with this specific group is called.

Some embodiments refer to options how the hardware supports for example the Hypervisor when switching between different virtual machines:

In an embodiment, multiple groups are assigned to a virtual machine. The hypervisor enables a group or groups related to the current virtual machine under execution. This virtual machine under execution can modify only the address ranges mapped to the group that is assigned to the virtual machine. The AND combination for combining the results provided by the privilege level evaluator takes accordingly only the enabled groups into account.

Where one virtual machine is in execution on a single CPU, multiple virtual machine groups use in one embodiment the same hardware ranges (shared resources). This is realized in an embodiment as follows: when switching from an virtual machine VMx to a different virtual machine VMy, the Hypervisor saves the content of the VMx related ranges and loads it with the last saved VMy settings. Another embodiment envisages that the Hypervisor clears the ranges assigned to the virtual machines when switching, each virtual machine has to re-configure the address ranges assigned to it whenever it is re-started.

Figure 6:
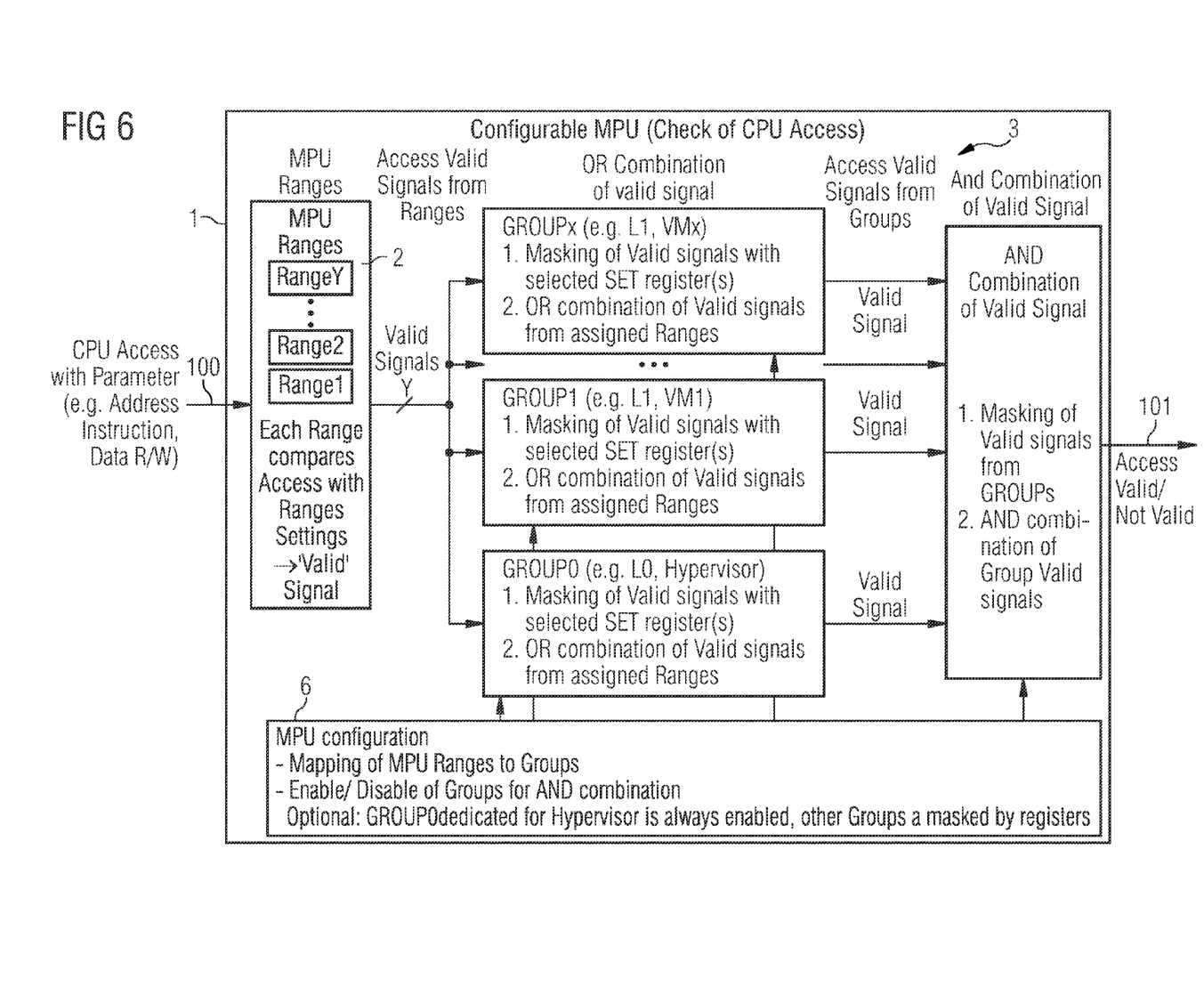
FIG. 6 illustrates the different steps within an embodiment of a memory protecting unit following an access request.

FIG. 6 shows another embodiment of the MPU 1 that receives an access request as input 100 and provides as output 101 whether access is granted or not. The access request 100 being a CPU Access has parameters, e.g. concerning the address of the memory address space and concerning an interaction.

The configurable MPU 1 checks CPU access to the memory address space. The access request 100 reaches in the shown embodiment at first an address evaluator 2 which refers to the address ranges covered by the MPU 1. Here, there are Y address ranges: Range 1, Range 2, . . . Range Y. Each of the Y address ranges are compared with the address parameter or parameters of the access request 100 whether the address belongs to the respective range. Further, it is evaluated whether the kind of interaction (reading, writing, executing) intended by the access request 100 is allowed for the respective address range. As each comparison provides a valid signal, there are Y "Valid signals".

The Valid Signals are OR combined by the indicated address results combiner 3 if the respective address ranges are associated with the same access protection group. For example, if two address ranges are associated with Group0, then the Valid signals of the two address ranges are OR combined.

Shown are three groups: Group0, Group1, and Groupx which represent, for example the privilege levels L0 or Hypervisor (Group0), L1 or VM1 (Group1), and L1 or VMx (Groupx). Concerning each group, in the shown embodiment, the following is performed:

1. Masking of Valid signals with selected SET registers.
2. OR combination of Valid signals for active address ranges.

Data about the mapping of the address ranges to the groups and information about the disabling or enabling of groups concerning the AND combination are stored in the data register 7.

The valid signals from the different groups—i.e. the results of the OR combinations—are combined with an AND combination. The combination refers to valid signals which deal with address ranges affected by the access request 100. Hence, if the access request 100 aims at an address that is associated with two different access protection groups, than the Valid signals of these two groups are AND combined. The result of the AND combination gives information about whether access of the access request is valid or not. This information is output via the output 101.

As the description refers to illustrative embodiments, this description is not intended to be construed in a limiting sense. Various modifications and combinations of the illustrative embodiments, as well as other embodiments, will be apparent to persons skilled in the art upon reference to the description. It is therefore intended that the appended claims encompass any such modifications or embodiments.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable. Some embodiments according to the invention comprise a data carrier having electronically readable control signals, which are capable of cooperating with a programmable computer system, such that one of the methods described herein is performed. Generally, embodiments of the present invention can be implemented as a computer program product with a program code, the program code being operative for performing one of the methods when the computer program product runs on a computer. The program code may for example be stored on a machine readable carrier. Other embodiments comprise the computer program for performing one of the methods described herein, stored on a machine readable carrier. In other words, an embodiment of the inventive method is, therefore, a computer program having a program code for performing one of the methods described herein, when the computer program runs on a computer. A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein. A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver. In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus. The apparatus described herein may be implemented using a hardware apparatus, or using a computer, or using a combination of a hardware apparatus and a computer. The methods described herein may be performed using a hardware apparatus, or using a computer, or using a combination of a hardware apparatus and a computer.

The invention claimed is:

1. A memory protector, comprising:
an address evaluator configured to evaluate whether address parameters refer to address ranges of a set of address ranges, and to provide results regarding the address ranges;
an address results combiner configured to combine the results provided by the address evaluator using a first logical combination depending on access protection groups to which the address ranges are mapped to provide first combined results, and to combine the first combined results using a second logical combination of different access protection groups within the first combined results to provide second combined results; and
a data register configured to store data related to the set of address ranges and related to a mapping of the address ranges to the access protection groups,
wherein the memory protector is configured to:
evaluate access requests referring to a memory address space, wherein the access requests comprise address parameters referring to addresses of the memory address space, and provide access grant results based on the second combined results provided by the address results combiner.

2. The memory protector of claim 1,
wherein the access requests comprise interaction parameters,
wherein the interaction parameters refer to types of interaction with the addresses of the memory address space to which the address parameters refer,
wherein the address evaluator is configured to evaluate whether the interaction parameters refer to interactions associated with active address ranges, and to provide results regarding the address ranges and regarding the interaction, and
wherein the active address ranges are address ranges to which the address parameters refer.

3. The memory protector of claim 1, wherein the address results combiner is configured to combine results provided by the address evaluator in accordance with the first logical combination using an OR combination that refer to address ranges mapped to the same access protection group.

4. The memory protector of claim 1, wherein the address results combiner is configured to combine the results provided by the address evaluator in accordance with the first logical combination using an OR combination that refer to active address ranges mapped to the same access protection group, and
wherein the active address ranges are address ranges to which the address parameters refer.

5. The memory protector of claim 1, wherein the address results combiner is configured to combine the first combined results in accordance with the second logical combination using an AND combination that refer to active address ranges mapped to different access protection groups, wherein active address ranges are address ranges to which the address parameters refer.

6. The memory protector of claim 1,
wherein the address results combiner is configured to combine the first combined results in accordance with the second logical combination using an AND combination that refer to active address ranges mapped to different access protection groups that are switched on,
wherein the active address ranges are address ranges to which the address parameters refer, and
wherein the data register comprises data concerning access protection groups that are switched on.

7. The memory protector of claim 1,
wherein the data register is such configured that defining data concerning at least one address range is enabled only for a privilege level associated with an access protection group to which the at least one address range is mapped.

8. The memory protector of claim 1,
wherein the data register is such configured that defining data concerning at least one address range is enabled only for a privilege level associated with an access protection group to which the at least one address range is mapped or for a higher privilege level.

9. The memory protector of claim 1, wherein the memory protector is configured to call, in case of a negative access grant result, a privilege level associated with an access protection group for which a violation of the access request was detected.

10. The memory protector of claim 1, wherein the memory protector is configured to call, in case of a negative access grant result a highest available privilege level.

11. The memory protector of claim 1, wherein the access requests include the address parameters and interaction parameters, the interaction parameters defining an interaction allowed for particular address ranges, and
wherein the address evaluator is configured to provide the results for the access requests to the address results combiner only for (i) address ranges within the set of address ranges in accordance with the address parameters, and (ii) interactions of a type that are allowed for the address ranges within the set of address ranges in accordance with the interaction parameters.

12. A method for protecting a memory address space, the method comprising:
mapping a set of address ranges of the memory address space to access protection groups; and
evaluating an access request referring to the memory address space,
wherein the evaluating the access request comprises:
evaluating whether address parameters comprised by the access request refer to address ranges of the set of address ranges and providing results regarding the address ranges;
combining the results using a first logical combination depending on access protection groups associated with the address ranges based on the mapping to provide first combined results;
combining the first combined results using a second logical combination of different access protection groups within the first combined results to provide second combined results; and
providing an access grant result based on the second combined results.

13. The method of claim 12, wherein the evaluating whether address parameters comprised by the access request refer to address ranges of the set of address ranges further comprises:
evaluating whether interaction parameters comprised by the access request refer to interactions associated with active address ranges being address ranges to which the address parameters refer.

14. The method of claim 12, wherein the evaluating the access request further comprises:
combining the results regarding address ranges mapped to the same access protection group in accordance with the first logical combination using an OR combination; and
combining the second combined results regarding active address ranges mapped to active access protection groups in accordance with the second logical combination using an AND combination,
wherein the active address ranges are address ranges to which the address parameters refer, and
wherein the active access protection groups are access protection groups to which active address ranges are mapped.

15. The method of claim 12,
wherein the mapping address ranges to access protection groups and/or associating address ranges with interactions is/are such restricted that modifications to an address range are allowed either to a privilege level associated with the access protection group to which the address range is mapped to or to a superior privilege level.

16. The method of claim 12, further comprising:
in case of a negative access grant result, calling a privilege level associated with an access protection group for which a violation was detected or calling a highest available privilege level.

17. The method of claim 12, further comprising:
in case of a negative access grant result, calling a highest available privilege level.

\* \* \* \* \*